US012694519B2

(12) United States Patent
Seo et al.

(10) Patent No.: US 12,694,519 B2
(45) Date of Patent: Jul. 28, 2026

(54) CLASSIFICATION METHOD AND ANALYSIS DEVICE FOR CEREBROVASCULAR BRANCH IN CEREBROVASCULAR IMAGE

(71) Applicants: SAMSUNG LIFE PUBLIC WELFARE FOUNDATION, Seoul (KR); Research & Business Foundation SUNGKYUNKWAN UNIVERSITY, Gyeonggi-do (KR)

(72) Inventors: Woo Keun Seo, Seoul (KR); Yoon Chul Kim, Seoul (KR); Suk Woo Hong, Seoul (KR); Ji Eun Lee, Seoul (KR); Ha Na Song, Seoul (KR); In Young Baek, Seoul (KR); Jong Un Choi, Seoul (KR); Hwan Ho Cho, Gyeonggi-do (KR); Hyun Jin Park, Gyeonggi-do (KR); Jong Hoon Kim, Gyeonggi-do (KR)

(73) Assignees: SAMSUNG LIFE PUBLIC WELFARE FOUNDATION, Seoul (KR); RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 464 days.

(21) Appl. No.: 18/323,015

(22) Filed: May 24, 2023

(65) Prior Publication Data

US 2023/0386030 A1    Nov. 30, 2023

(30) Foreign Application Priority Data

May 25, 2022    (KR) ........................ 10-2022-0064368

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/60* (2013.01); *G06V 10/40* (2022.01);
(Continued)

(58) Field of Classification Search
None
See application file for complete search history.

(56) References Cited

U.S. PATENT DOCUMENTS 12,367,582 B1 * 7/2025 Wang ..................... A61B 6/032
2020/0020435 A1 * 1/2020 Annavi ............... A61B 6/5217
(Continued)

FOREIGN PATENT DOCUMENTS

KR        102132564 B        7/2020
KR        10-2189624 B1    12/2020
(Continued)

*Primary Examiner* — Nancy Bitar
(74) *Attorney, Agent, or Firm* — Tarolli, Sundheim, Covell & Tummino LLP

(57) ABSTRACT

A method of classifying a cerebrovascular branch in cerebrovascular image is disclosed, the method including receiving, by an analysis device, an cerebrovascular image of a subject; extracting, by the analysis device, a plurality of vascular unit structures from the cerebrovascular image based on geometric features of a 3D model; extracting, by the analysis device, feature values for each of the plurality of vascular unit structures; inputting, by the analysis device, the feature values of each of the plurality of vascular unit structures into a first learning model trained in advance, and classifying chunks to which each of the plurality of vascular unit structures belongs; and inputting, by the analysis device, the feature values of each of the vascular unit structures belonging to same chunk into a second learning
(Continued)

100 model trained in advance, and classifying a vessel branch composed of the vascular unit structures belonging to the same chunk.

14 Claims, 9 Drawing Sheets

(51) Int. Cl.

| | | |
|---|---|---|
| *G06T 7/60* | | (2017.01) |
| *G06V 10/40* | | (2022.01) |
| *G06V 10/764* | | (2022.01) |
| *G06V 10/98* | | (2022.01) |

(52) U.S. Cl.
CPC ............ *G06V 10/764* (2022.01); *G06V 10/98* (2022.01); *G06T 2207/10088* (2013.01); *G06T* *2207/20081* (2013.01); *G06T 2207/30016* (2013.01); *G06T 2207/30101* (2013.01); *G06V* *2201/03* (2022.01)

(56) References Cited

U.S. PATENT DOCUMENTS

2023/0245301 A1* 8/2023 Wang ........................ G06T 7/13
                                                                    382/130
2023/0386029 A1* 11/2023 Seo ..................... A61B 5/02007

FOREIGN PATENT DOCUMENTS

| KR | 10-2021-0149350 A | 12/2021 |
|---|---|---|
| KR | 10-20220-017593 A | 2/2022 |
| KR | 10-02095731 B1 | 12/2024 |

* cited by examiner analysis device

400 storage device
(410)

interface device
(440)

memory
(420)

communication
device
(450)

arithmetic
device
(430)

output device
(460)

CLASSIFICATION METHOD AND ANALYSIS DEVICE FOR CEREBROVASCULAR BRANCH IN CEREBROVASCULAR IMAGE

CROSS REFERENCE TO RELATED APPLICATION

This application claims the benefit under 35 U.S.C. § 119(a) of Korean Patent Application No. 10-2022-0064368, filed on May 25, 2022, in the Korean Intellectual Property Office, the entire disclosure of which is incorporated herein by reference for all purposes.

BACKGROUND

1. Field

The following description relates to a technique for classifying vessel branches in a cerebrovascular image.

2. Description of the Related Art

Intracranial vascular structures and their variations must be identified for the diagnosis and treatment of cerebrovascular diseases such as brain stroke. Magnetic resonance angiography (MRA) has been widely used to evaluate cerebral artery disease.

There have been previous studies to analyze and quantitatively identify the cerebrovascular structure on the basis of images. In terms of studies in the related art, there were limitations in classifying cerebrovascular structures or identifying mutations only using images, due to the complexity and inter-individual differences in cerebrovascular structures.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of classifying a cerebrovascular branch in cerebrovascular image includes receiving, by an analysis device, a cerebrovascular image of a subject; extracting, by the analysis device, a plurality of vascular unit structures from the cerebrovascular image based on geometric features of a 3D model; extracting, by the analysis device, feature values for each of the plurality of vascular unit structures; inputting, by the analysis device, the feature values of each of the plurality of vascular unit structures into a first learning model trained in advance, and classifying chunks to which each of the plurality of vascular unit structures belongs; and inputting, by the analysis device, the feature values of each of the vascular unit structures belonging to same chunk into a second learning model trained in advance, and classifying a vessel branch composed of the vascular unit structures belonging to the same chunk.

In another aspect, there is provided an analysis device for analyzing a cerebrovascular branch in cerebrovascular image includes an input unit receiving a cerebrovascular image of a subject; a storage device storing a first learning model of classifying chunks to which a vascular unit structure belongs and a second learning model of classifying a cerebrovascular branch of the vascular unit structure belonging to the same chunk; and an arithmetic device extracting a plurality of vascular unit structures based on geometric features of a 3D model from the cerebrovascular image, inputting feature values for each of the plurality of vascular unit structures into the first learning model to classify chunks to which each of the plurality of vascular unit structures belongs, and inputting feature values of each of the vascular unit structures belonging to the same chunk into the second learning model to analyze vessel branch characteristics constituted by the vascular unit structures belonging to the same chunk.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The researcher has analyzed the image using time-of-flight (TOF) MRA. Therefore, the following description is made based on TOF MRA. The technology described below may also be applied to other types of medical images.

Herein, it is noted that the analysis device analyzes the TOF MRA to classify the cerebral artery branch. The analysis device may be implemented with various devices capable of constant data processing. For example, the analysis device may be implemented as a PC, a server on a network, a smart device, a chipset with embedded dedicated program, and the like.

Figure 1:
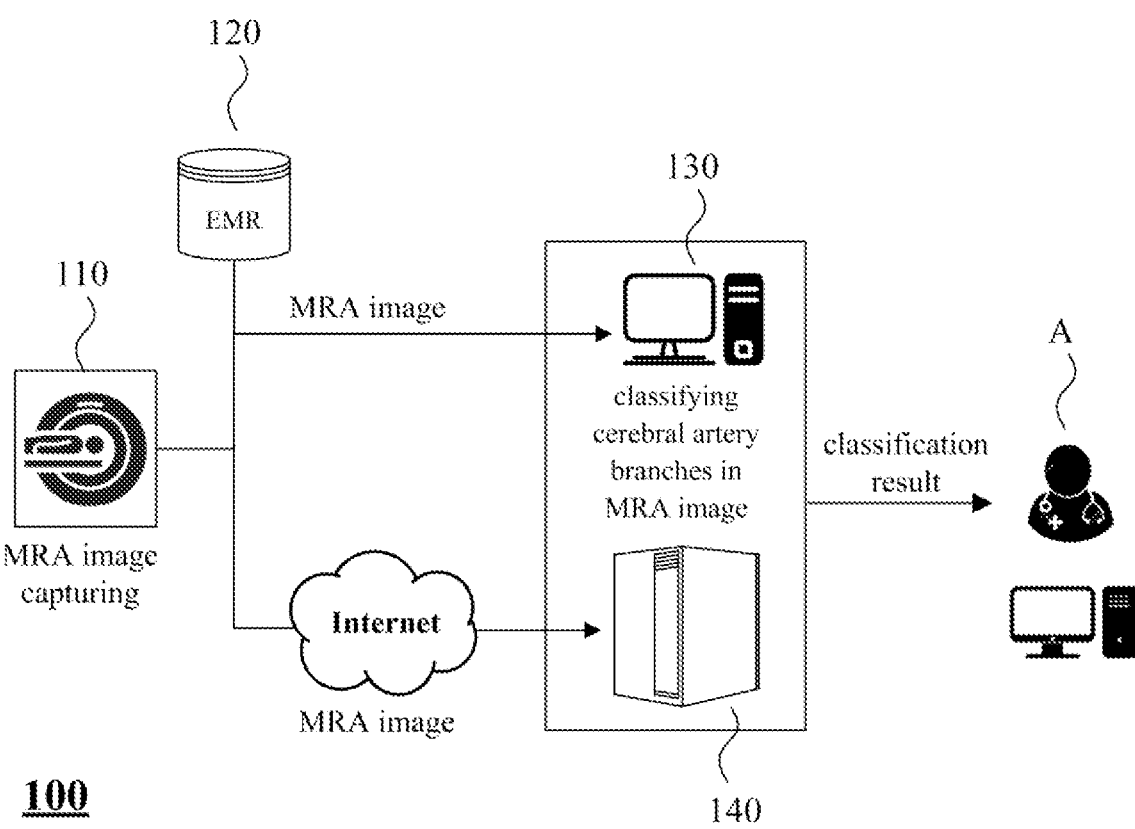
FIG. 1 illustrates an example of system for classifying cerebral artery branches.

FIG. 1 illustrates an example of a system 100 for classifying cerebral artery branches. In FIG. 1, an analysis device may be implemented as a computer terminal 130 and a server 140.

A magnetic resonance angiography (MRA) 110 generates an MRA image of a patient. An MRA image or TOF MRA image generated by the MRA 110 may be stored in an electronic medical record (EMR) 120 or a separate database.

In FIG. 1, a user A may classify cerebral artery branches in an MRA image using a computer terminal 130. The computer terminal 130 may receive the MRA image from the MRA 110 or the EMR 120 through a wired or wireless network. In some cases, the computer terminal 130 may be physically connected to the MRA 110. The computer terminal 130 may extract a certain cerebrovascular structure from the MRA image, and input features of the extracted cerebrovascular structure into a learning model built in advance, to derive a classification result of the cerebral artery branches. A detailed classification process of the cerebral artery branches will be described later. The user A may check the classification result from the computer terminal 130.

The server 140 may receive the MRA image from the MRA 110 or the EMR 120. The server 140 may extract a certain cerebrovascular structure from the MRA image, and input features of the extracted cerebrovascular structure into a learning model built in advance, to derive a classification result of the cerebral artery branches. A detailed classification process of the cerebral artery branches will be specifically described later. The server 140 may transmit the classification result of the cerebral artery branches to the user A. The user A may check the classification result through his terminal.

The computer terminal 130 and/or the server 140 may store the classification result in the EMR 120.

Hereinafter, a process of building a model for classifying cerebral artery branches and a verification result will be described.

Figure 2:
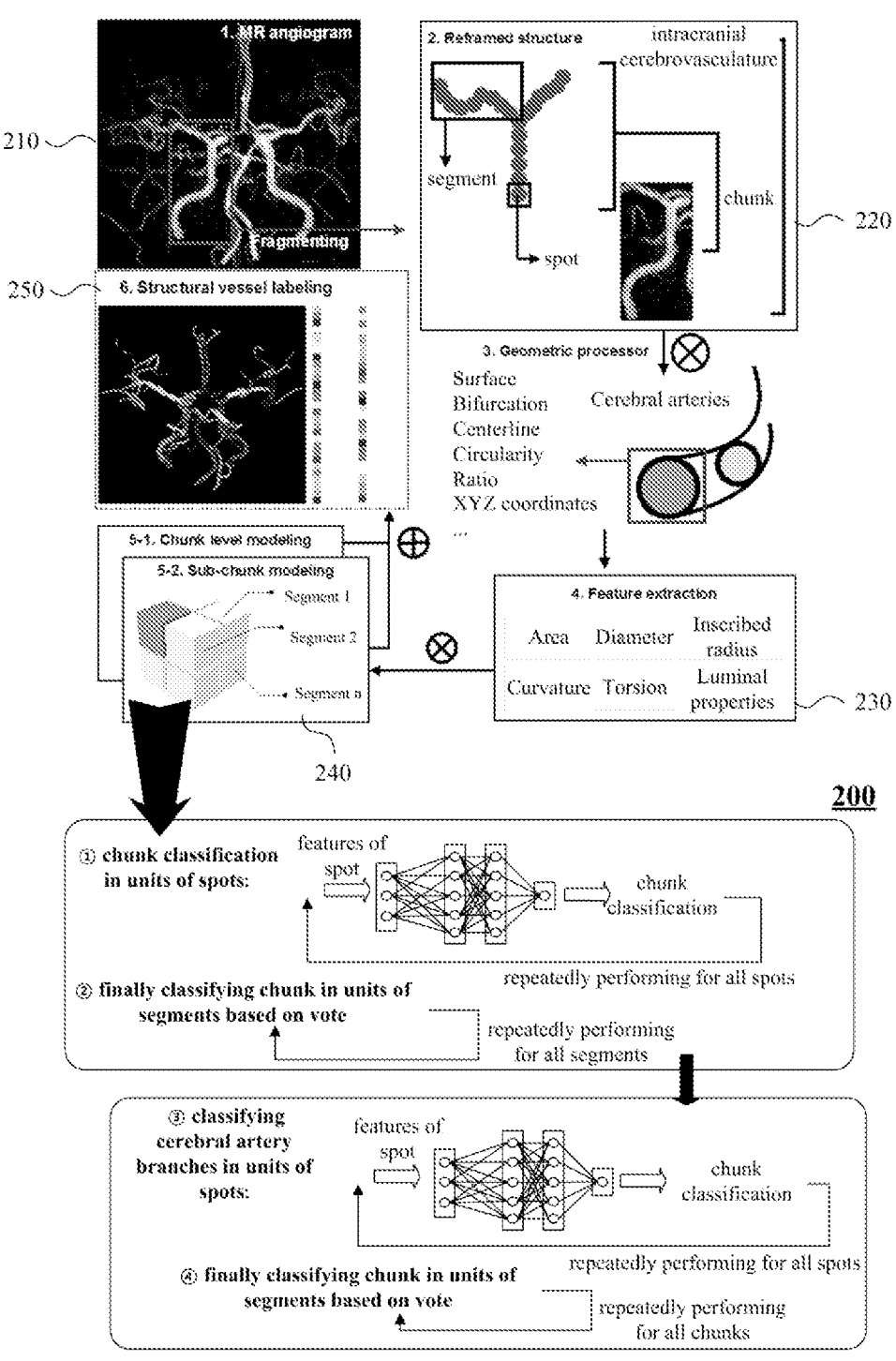
FIG. 2 illustrates an example of process of classifying cerebral artery branches.

FIG. 2 illustrates an example of a process 200 for classifying cerebral artery branches. With regard to FIG. 2, a procedure in which the researcher extracts vascular structures from the TOF MRA image and classifies vessel branches based on features of the vascular structures will be described. In addition, with regard to FIG. 2, an image processing procedure and a model-building procedure performed by the researcher will also be described.

The analysis device receives the TOF MRA image (210). The analysis device processes a structure to extract image features from the TOF MRA image (220). The analysis device may detect a desired vascular structure using geometric processing that reconstructs a 3D model.

The vascular structure refers to a spot, segment, chunk, and branch. The analysis device extracts the vascular structure from the input image using a certain image processing program, to obtain features of the corresponding structure.

First, the vasculature system used by the researcher will be described. The researcher has configured the vascular unit structure at four hierarchical levels, which is different from the method used in the clinical neurology field in the related art.

A spot refers to a basic unit of a 3D cerebral artery tree cubic cell with a regular spacing (size) from the artery centerline. The researcher has defined the spot as a cubic cell with a spacing of 0.2801 mm from the arterial centerline.

A segment is composed of a plurality of spots which are segmented based on a bifurcation point in the vascular structure. That is, the segment corresponds to a set of consecutive spots between branch points of blood vessels.

The vessel branch is composed of a plurality of segments. The vessel branch may be identified as one of specific types on a segment-by-segment basis according to the geometry of a vascular bifurcation point. The researcher has classified the vessel branch into 62 types of branches according to the geometry of the vascular bifurcation point. In other words, the vessel branch may be regularly classified according to the vascular unit structure proposed by the researcher. Meanwhile, the vessel branch may be identified by nomenclature traditionally used in the clinical field.

The vessel branch may be segmented into (i) symmetry, (ii) anterior or posterior, (iii) basal or pial, and (iv) middle cerebral artery cerebral arteries (MCA), anterior cerebral arteries (ACA), or posterior cerebral arteries (PCA), according to clinical criteria. Based on such segmentation, the researcher has defined a chunk as a higher structure than the branch. The chunk may be classified using at least one criterion among groups including (i) symmetry, (ii) anterior or posterior, (iii) basal or pial, and (iv) middle cerebral arteries (MCA), anterior cerebral arteries including criteria for the anterior cerebral arteries (ACA) and posterior cerebral arteries (PCA). In other words, the chunk clinically refers to vessel branches of a higher mass. The reason for defining the chunk is because it is difficult to classify branch units at once due to a detailed structure of the vessel branch.

The researchers have defined 20 types of vascular chunks as shown in Table 1 below. Each chunk may be further subdivided into one or more branches.

TABLE 1

| number | Chunk (abbreviation) | Chunk code | branch(abbreviation) | Branch code |
|--------|---------------------|------------|---------------------|-------------|
| 1 | Anterior communicating artery (ACOA) | A0 | anterior communicating artery (ACoA) | A0.01 |

TABLE 1-continued

| number | Chunk (abbreviation) | Chunk code | branch(abbreviation) | Branch code |
|---|---|---|---|---|
| 2 | Right internal carotid artery (RtICA) | A1 | Right internal carotid artery (Rt ICA) | A1.01 |
| | | | Right ophthalmic artery (Rt Ophthalmic) | A1.02 |
| | | | Right anterior choroidal artery (Rt AChA) | A1.03 |
| 3 | Left internal carotid artery (LtICA) | A2 | Left internal carotid artery (Lt ICA) | A2.01 |
| | | | Left ophthalmic artery (Lt Ophthalmic) | A2.02 |
| | | | Left anterior choroidal artery (Lt AChA) | A2.03 |
| 4 | Right anterior cerebral basal arteries - middle cerebral artery (RtBasalMCA) | A3 | Right MCA M1 (Rt M1) | A3.01 |
| | | | Right M2 superior (Rt MCA Superior) | A3.02 |
| | | | Right M2 inferior (Rt MCA Inferior) | A3.03 |
| 5 | Left anterior cerebral basal arteries - middle cerebral artery (LtBasalMCA) | A4 | Left anterior basal MCA (Lt M1) | A4.01 |
| | | | Left_MCA_Superior (Lt MCA Superior) | A4.02 |
| | | | Left_MCA_Inferior (Lt MCA Inferior) | A4.03 |
| 6 | Right anterior cerebral basal arteries - anterior cerebral artery (RtBasalACA) | A5 | Right ACA A1 (Rt A1) | A5.01 |
| | | | Right ACA A2 (Rt A2) | A5.02 |
| | | | Right ACA A1 + A2 (Rt A1 + A2) | A5.03 |
| 7 | Left anterior cerebral basal arteries - anterior cerebral artery (LtBasalACA) | A6 | Left ACA A1 (Lt A1) | A6.01 |
| | | | Left ACA A2 (Lt A2) | A6.02 |
| | | | Left ACA A1 + A2 (Lt A1 + A2) | A6.03 |
| 8 | Right anterior cerebral pial arteries - middle cerebral artery (RtPialMCA) | A7 | Right orbitofrontal artery (Rt MCA lat OFA) | A7.01 |
| | | | Right MCA PreRolandic artery (Rt MCA PreRolandic) | A7.02 |
| | | | Right MCA Rolandic artery (Rt MCA Rolandic) | A7.03 |
| | | | Right MCA Anterior Parietal artery (Rt MCA AntPerietal) | A7.04 |
| | | | Right MCA Postior Parietal artery (Rt MCA PostParietal) | A7.05 |
| | | | Right MCA Angular artery (Rt MCA Angular) | A7.06 |
| | | | Right MCA Posterior Temporal artery (Rt MCA PostTemporal) | A7.07 |
| | | | Right MCA Midtemporal artery (Rt MCA MidTemporal) | A7.08 |
| | | | Right MCA Anterior temporal artery (Rt MCA AntTemporal) | A7.09 |
| 9 | Left anterior cerebral pial arteries - middle cerebral artery (LtPialMCA) | A8 | Left MCA orbitofrontal artery (Lt MCA lat OFA) | A8.01 |
| | | | Left MCA PreRolandic artery (Lt MCA PreRolandic) | A8.02 |
| | | | Left MCA Rolandic artery (Lt MCA Rolandic) | A8.03 |
| | | | Left MCA Anterior Parietal artery (Lt MCA AntPerietal) | A8.04 |
| | | | Left MCA Postior Parietal artery (Lt MCA PostParietal) | A8.05 |
| | | | Left MCA Angular artery (Lt MCA Angular) | A8.06 |
| | | | Left MCA Posterior Temporal artery (Lt MCA PostTemporal) | A8.07 |
| | | | Left MCA Midtemporal artery (Lt MCA MidTemporal) | A8.08 |
| | | | Left MCA Antior temporal artery (Lt MCA AntTemporal) | A8.09 |

TABLE 1-continued

| number | Chunk (abbreviation) | Chunk code | branch(abbreviation) | Branch code |
|---|---|---|---|---|
| 10 | Right anterior cerebral pial arteries - anterior cerebral artery (RtPialACA) | A9 | Right ACA orbitofrontal artery (Rt ACA med OFA) | A9.01 |
|  |  |  | Right ACA Frontopolar artery (Rt A2 Frontopolar) | A9.02 |
|  |  |  | Right ACA Callosamarginal artery (Rt ACA Callosamarginal) | A9.03 |
|  |  |  | Right ACA Pericallosal artery (Rt ACA Pericallosal) | A9.04 |
| 11 | Left anterior cerebral pial arteries - anterior cerebral artery (LtPialACA) | A10 | Left ACA orbitofrontal artery (Lt ACA med OFA) | A10.01 |
|  |  |  | Left ACA Frontopolar artery (Lt A2 Frontopolar) | A10.02 |
|  |  |  | Left ACA Callosamarginal artery (Lt ACA Callosamarginal) | A10.03 |
|  |  |  | Left ACA Pericallosal artery (Lt ACA Pericallosal) | A10.04 |
| 12 | Right posterior - vertebral artery (RtVA) | P1 | Right vertebral artery (Rt VA) | P1.01 |
| 13 | Left posterior - vertebral artery (LtVA) | P2 | Left vertebral artery (Lt VA) | P2.01 |
| 14 | Right posterior basal - posterior cerebral artery (RtBasalPCA) | P3 | Right PCA P1 (Rt P1) | P3.01 |
|  |  |  | Right PCA P2 (Rt P2) | P3.02 |
|  |  |  | Right PCA P1, P2 (Rt P1 + P2) | P3.03 |
|  |  |  | Right PCA P3, P4 (Rt P3, P4) | P3.04 |
| 15 | Left posterior basal - posterior cerebral artery (LtBasalPCA) | P4 | Left PCA P1 (Lt P1) | P4.01 |
|  |  |  | Left PCA P2 (Lt P2) | P4.02 |
|  |  |  | Left PCA P1 + P2 (Lt P1 + P2) | P4.03 |
| 16 | Right posterior pial - posterior cerebral artery (RtPialPCA) | P5 | Right posterior communcating artery (Rt PCoA) | P5.01 |
|  |  |  | Right Hippocampal artery (Rt Hippocampal artery) | P5.02 |
|  |  |  | Right PCA Anterior Temporal artery (Rt PCA AnteriorTemporal) | P5.03 |
|  |  |  | Right PCA Posterior Temporal artery (Rt PCA PosteriorTemporal) | P5.04 |
|  |  |  | Right parieto-occipital artery (Rt parieto-occipital) | P5.05 |
|  |  |  | Right calcarine artery (Rt Calcarine) | P5.06 |
| 17 | Left posterior pial - posterior cerebral artery (LtPialPCA) | P6 | Left posterior communcating artery (Lt PCoA) | P6.01 |
|  |  |  | Left_Hippocampal artery (Lt Hippocampal artery) | P6.02 |
|  |  |  | Left_PCA_Anterio Rightemporal (Lt PCA AnteriorTemporal) | P6.03 |
|  |  |  | Left_PCA_Posterio Rightemporal (Lt PCA PosteriorTemporal) | P6.04 |
|  |  |  | Left parieto-occipital artery (Lt parieto-occipital) | P6.05 |
|  |  |  | Left calcarine artery (Lt Calcarine) | P6.06 |
| 18 | Right posterior - superior cerebral artery, anterior inferior cerebral artery, posterior inferiorcerebellar artery (RtCbll) | P7 | Right posterior inferior cerebellar artery (Rt PICA) | P7.01 |
|  |  |  | Right anterior inferior cerebellar artery (Rt AICA) | P7.02 |
|  |  |  | Right internal auditory artery (Rt IAA) | P7.03 |
|  |  |  | Right superior cerebellar artery (Rt SCA) | P7.04 |
| 19 | Left posterior - superior cerebral artery, anterior inferior cerebral artery, posterior inferiorcerebellar artery (LtCbll) | P8 | Left posterior inferior cerebellar artery (Lt PICA) | P8.01 |
|  |  |  | Left anterior inferior cerebellar artery (Lt AICA) | P8.02 |
|  |  |  | Left internal auditory artery (Lt IAA) | P8.03 |
|  |  |  | Left superior cerebellar artery (Lt SCA) | P8.04 |

TABLE 1-continued

| number | Chunk (abbreviation) | Chunk code | branch(abbreviation) | Branch code |
|---|---|---|---|---|
| 20 | Basilar artery (BA) | P0 | Basilar artery (BA) | P0.01 |

The researcher has acquired images of the intracranial arteries on a 3.0 T Philips Achieva MRI scanner (Philips Medical Systems). The researcher used whole-brain 3D MRA image with a TOF protocol collected from each participant. The parameters for an isotropic 0.284×0.284 mm3 size voxel are as follows: echo time of 4.59 ms, repetition time 22 ms, flip angle 23°, RBW 130 Hz/pixel, GRAPPA factor 3, and 32 reference line.

The data format used by the researcher is DICOM in TOF format. The researcher has anonymized the raw data using DICOM Anonymizer Pro, and performed region growing using a vascular analysis program that creates segmented cerebral angiography masks.

A process of extracting the vascular surface from cerebrovascular MRA will be described hereinafter. The researcher has performed an isosurface dissection to create a vascular surface model using the Vascular Modeling Toolkit (VMTK) library. The researcher removed artifacts using bicubic interpolation and resampled the rough image on a regular flat grid. This enables a z-axis voxel to be fitted to an isovoxel image scale. A contiguous 3D space may be divided into a number of cells based on each vertex of the isosurfaces. Through this process, the researcher may extract the main arterial centerline from the border surface of each cell in cerebrovascular MRA.

The analysis device may segment the vascular surface into cells of a certain size in the cerebrovascular MRA image, and extract the starting point and skeleton of the central line of the brain artery based on the vascular surface.

The analysis device may perform vascular skeleton refinement to make the end point of the centerline more distinct. The analysis device may (i) skeletonize the cerebrovascular region and surface, (ii) prune branches under a predetermined threshold, (iii) create a linked list of tree structures based on the refined scaffold structure, and (iv) determine the end point by specifying a leaf node from the linked list. The analysis device may extract the centerline of the blood vessel by tracing the cell boundary connecting the determined start point and end point.

Thereafter, the analysis device quantifies the vascular feature vectors for groups separated based on the divergence point of the centerline (230). The quantified vascular features include cerebral vessel cross-sectional area, maximally inscribed sphere radius, minimum and maximum diameters, maximum-minimum radius ratio, surface circumference, distortion, curvature, and luminal circularity.

The researcher has performed automated segmentation at the level of normal nomenclature of the cerebrovascular system in the brain MRA image, and built a model to perform classification (labeling) for the cerebral artery branch. Here, the analysis device classifies the vascular structure at a chunk level using a first learning model built in advance, and classify each chunk into specific branches (cerebral artery branches) using a second learning model (240).

The researcher has used multi-layer perceptron (MLP) as a supervised learning model.

Of course, as learning models for classifying cerebral artery branches, other models may be used. Here, the machine learning model includes a decision tree, a random forest (RF), a K-nearest neighbor (KNN), a Naive Bayes, a support vector machine (SVM), and an artificial neural network (ANN). Herein, the ANNs are statistical learning algorithms that imitate biological neural networks. Various neural network models are being studied. A deep learning network (DNN) may model complex non-linear relationships like a general artificial neural network. The DNN have been studied as various types of models, such as, for example, convolutional neural networks (CNNs), recurrent neural networks (RNNs), restricted Boltzmann machines (RBMs), deep belief networks (DBNs), generative adversarial networks (GANs), relation networks (RLs), and the like.

The analysis device first performs classification at a chunk level (Step 1: chunk level modeling).

The analysis device first inputs the feature vector of each spot into the first learning model in units of spots extracted from the TOF MRA image. Here, the feature vector of the spot may be a value for at least one of the vascular features as described above. Furthermore, the feature vector of the spot may further include a brightness of the spot region.

The researcher has used DNN as the first learning model. The first learning model classifies input spots at a chunk level. This process is repeated for all spots. As a result, the analysis device obtains a result of chunk classification for all spots (primary classification).

Furthermore, the analysis device may finish the primary chunk classification for all spots, and then perform voting-based classification for accuracy improvement (secondary classification). To this end, the analysis device distinguishes the segments based on the bifurcation points of blood vessels. This process enables the analysis device to distinguish segments of the entire blood vessel. The analysis device may perform chunk allocation based on a majority vote in units of segments. The analysis device may check the result of classification by the first learning model for each of the spots belonging to the same segment, and determine the most classified result (chunk type) as a final classification result of spots constituting the corresponding segment. This enables the analysis device to classify the chunk to which the corresponding segment (or spots belonging to the corresponding segment) belongs in units of segments. This process may be repeated for all segments.

Hereinafter, the analysis device performs sub-classification in units of classified chunks (Step 2: Sub-chunk modeling).

The analysis device inputs each of the spots belonging to the same chunk into the second learning model in units of chunks. The second learning model classifies the input spots into specific cerebral artery branches. This process is repeated for all chunks. As a result, the analysis device obtains a cerebral artery branch classification result (primary classification result) for all spots.

Meanwhile, the second learning model may be the same type of model (DNN) as the first learning model. In addition, the second learning model may be a machine learning model of a type different from the first learning model. For example, the second learning model may be an ensemble model.

Furthermore, the analysis device may finish the cerebral artery branch classification results (primary classification) for all spots, and then perform voting-based classification (secondary classification) for accuracy improvement. The analysis device may perform chunk allocation based on a majority vote in units of chunks. The analysis device may check classification results performed by the second learning model for each of the spots belonging to the same chunk, and then determine the most identified result (of cerebral artery branch type) as a final classification result of the spots constituting the corresponding chunk. This enables the analysis device to classify a cerebral artery branch to which the corresponding chunk (or spots belonging to the corresponding chunk) belongs in units of chunks. This process may be repeated for all chunks.

Meanwhile, the analysis device may verify or correct the cerebral artery branch classification result (primary classification) for the spots in another way. For example, the analysis device may verify whether the direction is reversed based on 3D coordinates for segments (branches belonging to the corresponding segment) in which branches are clearly segmented into left and right or up and down in the image data, and correct the classification information when the direction is reversed.

The analysis device computes information obtained by performing classification in units of cerebral artery branches in the brain MRA image of the subject (patient) through the process shown in FIG. 2 (250). The medical staff may diagnose diseases and take treatment measures for the subject based on the final classification result.

Figure 3:
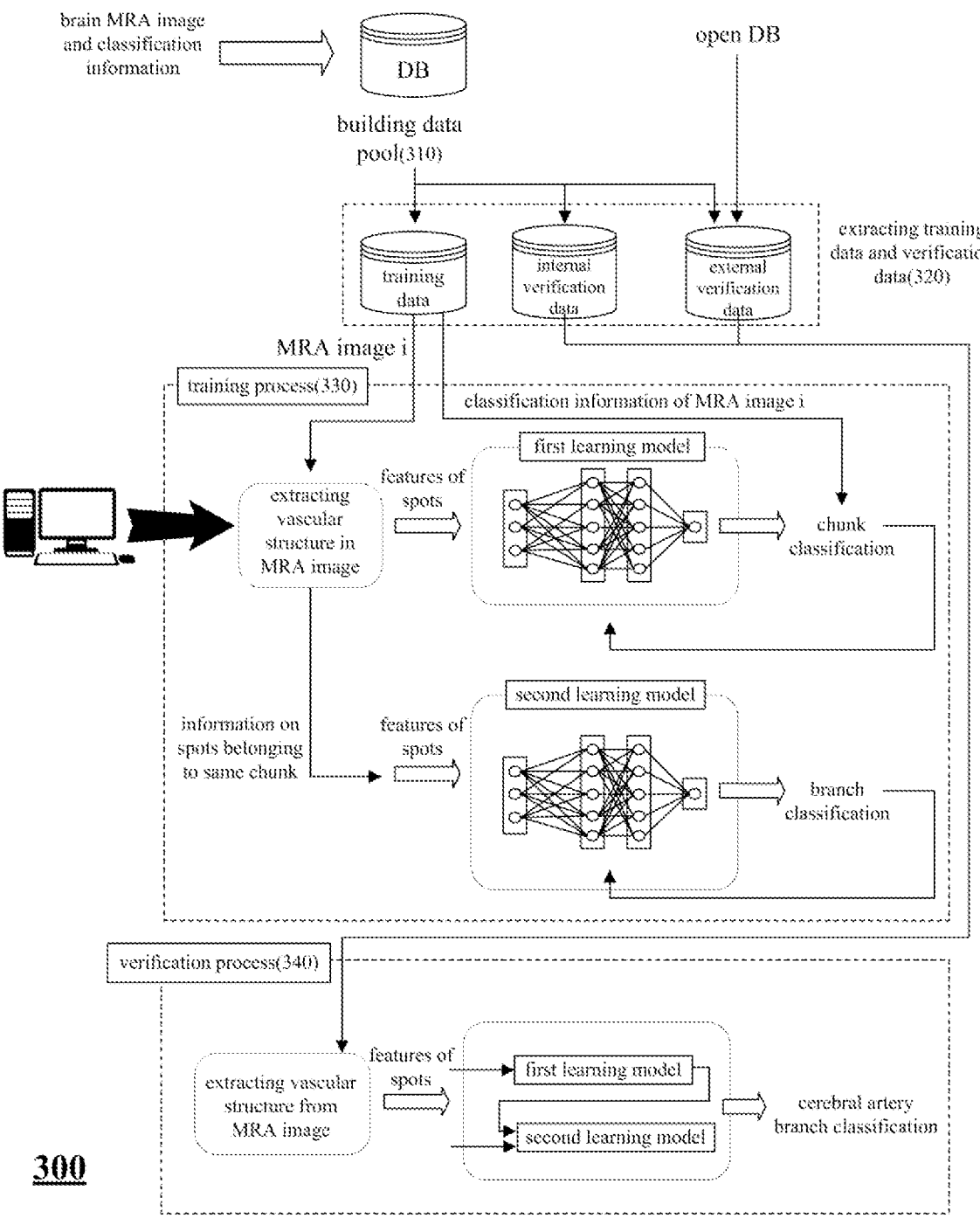
FIG. 3 illustrates an example of training and verification process for a model used for classifying cerebral artery branches.

FIG. 3 illustrates an example of a training and verification process 300 for a model used for classifying cerebral artery branches.

The researcher studied stroke patients clinically confirmed at Samsung Medical Center after obtaining consent from them. The control cohort is defined as normal people who have undergone MRA imaging from Jan. 1, 2013 to Dec. 31, 2016 at the Samsung Hospital Health Examination Center.

The researcher studied a healthy control group, stroke patients with intracranial atheroscledrosis (ICAS) (stroke with ICAS, ICAS group), and normal stroke patients (stroke group). The researcher studied 157 participants between the ages of 20 and 94. A total of 157 participants were divided into the control group with 42 people, the ICAS group with 46 people, and the stroke group with 69 people. The researcher used 70% of the collected cohort data as training data and 30% as validation data.

The researcher has analyzed the TOF MRA of the participants to identify the structure of the cerebral artery vessels in advance (discriminating the images using experts). That is, the researcher classified the cerebral artery branches in the training data and verification data in advance. The classification information for the cerebral artery branches is simply referred to as classification information hereinafter.

The researcher builds a data pool for training and verification (310). The data pool contains brain MRA images of the participants.

The researcher extracts training data and verification data (320). The researcher prepares the training data and the internal verification data based on the MRA images acquired through the affiliated institution. The training data and the verification data each include a brain MRA image of a specific subject and classification information for the image. In addition, the researcher may perform external verification using images prepared by the corresponding institution. Of course, the external verification data may be prepared by collecting MRA images and classification information in an external open database (DB).

The researcher trains the aforementioned learning model using training data (330). The learning model is trained on an analysis device or a separate computer device. Hereinafter, a device for building the learning model is referred to as a learning device. The learning device trains the first learning model and the second learning model using the training data. The learning device extracts the aforementioned vascular unit structures from the MRA image. The process of extracting the vascular unit structure is the same as described above. The vascular unit structures include the spot, segment, and the like, as described above. The learning device classifies chunks to which the corresponding spot belongs by inputting features in units of spots in the extracted vascular unit structures into the first learning model. In this process, the learning device inputs features of the spots into the first learning model, and then compares a probability value of chunk classification output by the first learning model with classification information on the corresponding spot to update parameters of the first learning model. FIG. 3 illustrates a learning process performed using MRA image i, in which the learning process is repeatedly performed using various training data. By repeating this process, the first learning model is trained in such a manner as to output the chunk classification of the corresponding spot based on features of the input spots.

Meanwhile, even in the training process of the learning model, the learning device performs voting based on the classification results of spots belonging to each segment, to determine a final classification result of spots belonging to the corresponding segment.

The learning device inputs features of each of spots belonging to the same chunk into the second learning model in units of chunks, and then classifies a cerebral artery branch to which the corresponding spot belongs. Herein, the input spots are spots belonging to the same chunk. The learning device inputs features of spots belonging to the same chunk into the second learning model, and compares probability values of cerebral artery branch classification output by the second learning model with classification information on the corresponding spot, to update parameters of the second learning model. By repeating this process, the second learning model is trained to output the cerebral artery branch classification of the spots based on features of the spots belonging to the same chunk.

Meanwhile, even in the training process of the learning model, the learning device may perform voting based on the classification result of the spots belonging to the chunk, to determine a final classification result of the spots belonging to the corresponding chunk.

Then, the learning device verifies the learning model trained using internal verification data and/or external verification data (340). The learning device extracts the vascular unit structure from the input MRA image, and inputs features of each spot into the first learning model, to classify chunks to which the corresponding spots belong. Thereafter, the learning device classifies the cerebral artery branch to which the corresponding spots belong by inputting features of each spot belonging to the same chunk to the second learning model according to the result of the chunk classification. The researcher confirmed the performance of the classification result using verification data.

Figure 4:
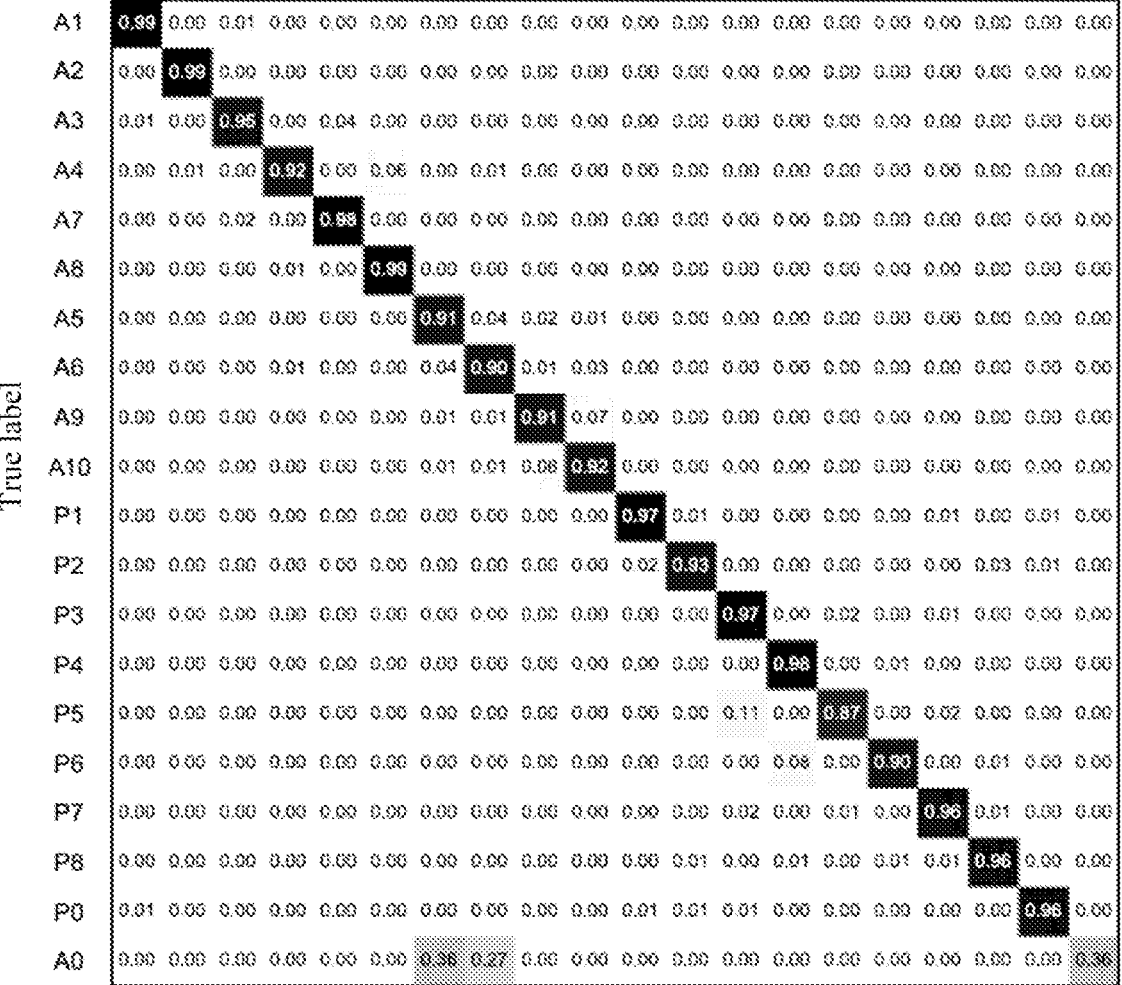
FIG. 4 illustrates a result of predicting chunks for the healthy control group.
Figure 5:
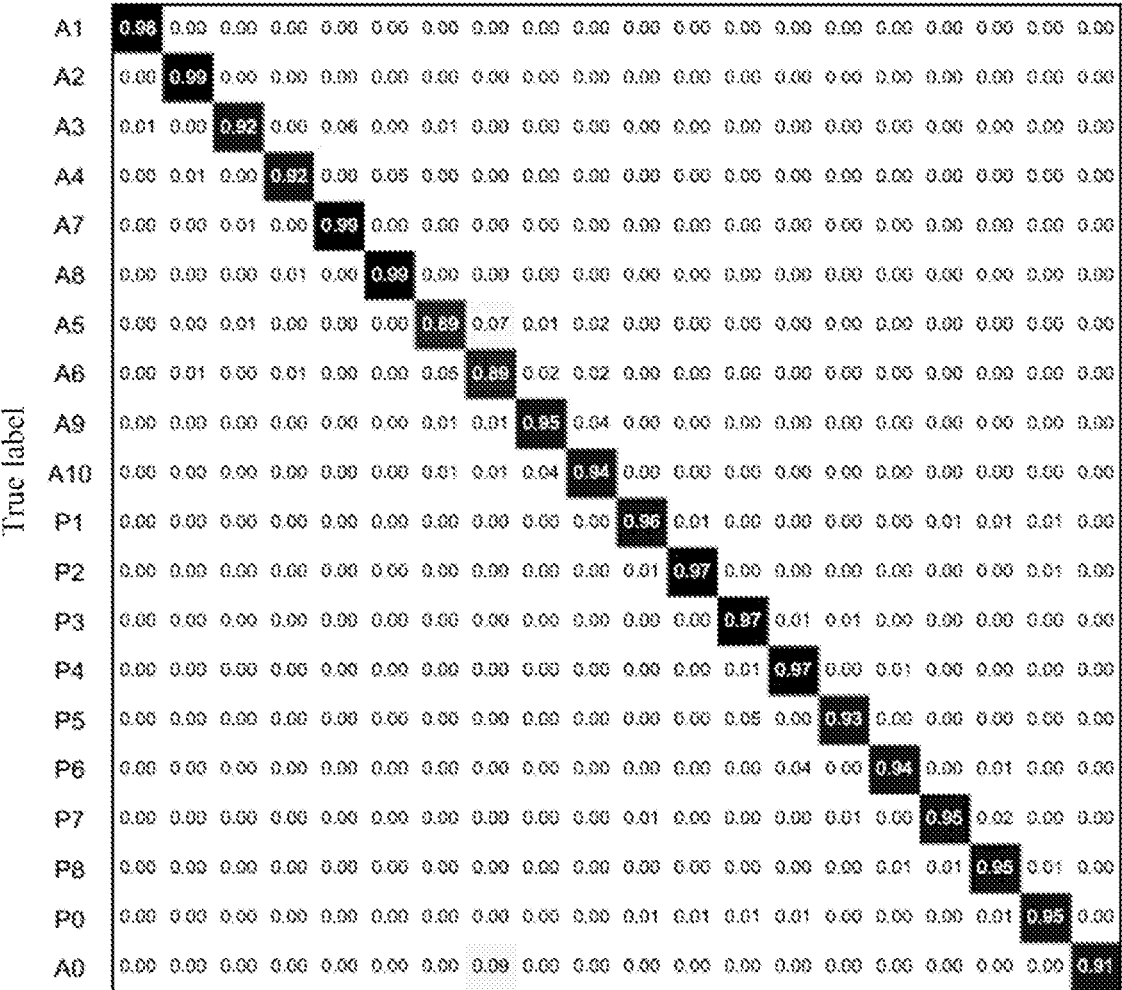
FIG. 5 illustrates a result of predicting chunks for the ICAS group.
Figure 6:
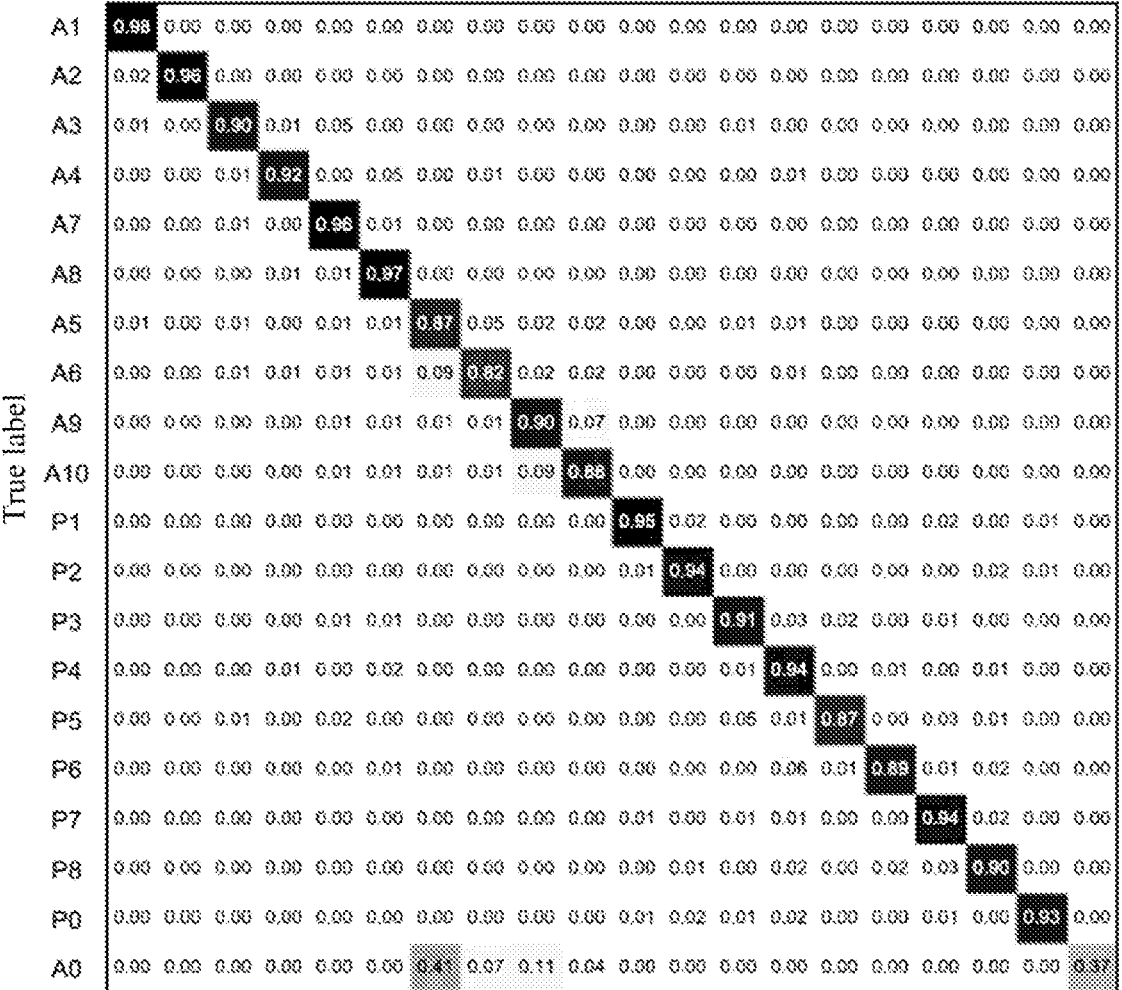
FIG. 6 illustrates a result of predicting chunks for the stroke group.

FIGS. 4 to 6 illustrate results of verifying the prediction performance for chunks in the cerebrovascular structure. FIG. 4 illustrates a result of predicting chunks for the healthy control group. FIG. 5 illustrates a result of predicting chunks for the ICAS group. FIG. 6 illustrates a result of predicting chunks for the stroke group. In the graphs of FIGS. 4 to 6, the vertical axis indicates a true label, and the horizontal axis indicates a predicted label by the model. In the model built by the researcher, among 20 chunks, only the left anterior basolateral anterior cerebral artery chunks (left anterior basal ACA, LtBasalACA, A6) showed 82% prediction accuracy, and the rest showed prediction accuracy between 87% and 99%. In addition, the model built by the researchers showed similar prediction accuracy for each chunk in the healthy control group, the stroke group, and the ICAS group. However, the anterior communicating artery (ACOA, A0) showed some predictive deviation depending on the subject group. This may be due to the limited sample size and high anatomical variability for ACOA. AUC (area under the curve)-ROC (receiver operating characteristic) for chunk classification showed high performance overall, ranging from 0.99 to 1.00, and the precision-recall curve (PRC) showed 0.992.

The researcher also has verified the classification accuracy of the model for the branching of the cerebral artery branch. Table 2 below shows the prediction accuracy of main cerebral artery branches belonging to the 20 chunks as a result of the experiment. Table 2 below shows results of summarizing the entire cohort (control group, ICAS group, and Stroke group). When there is only one cerebral artery branch belonging to the chunk, the prediction accuracy for the cerebral artery branch is not separately indicated.

TABLE 2

| Chunk code | chunk | Accuracy (%) | Main cerebral artery branch | Accuracy (%) |
|---|---|---|---|---|
| A1 | Right ICA | 98-99 | Right ICA | 100 |
| | | | Right OA | 94-99 |
| | | | Right ACHA | 85 |
| A2 | Left ICA | 96-99 | Left ICA | 100 |
| | | | Left OA | 91-95 |
| | | | Left ACHA | 91 |
| A3 | Right anterior basal MCA | 90-95 | Right M1 | 96 |
| | | | Right MCAS | 87-91 |
| | | | Right MCAI | 90-96 |
| A4 | Left anterior basal MCA | 92 | Left M1 | 95-97 |
| | | | Left MCAS | 85-92 |
| | | | Left MCAI | 92-94 |
| A7 | Right anterior pial MCA | 96-99 | Right MCALO | 95 |
| | | | right MCAPR | 87-98 |
| | | | right MCAR | 95-97 |
| | | | right MCAAP | 87-95 |
| | | | right MCAPP | 93-95 |
| | | | right MCAA | 94-97 |
| | | | right MCAPT | 90-94 |
| | | | right MCAMT | 93 |
| | | | right MCAAT | 90-94 |
| | | | right MCAPF | 82-85 |
| A8 | Left anterior pial MCA | 97-99 | Left MCALO | 81 |
| | | | left MCAPR | 93-96 |
| | | | left MCAR | 94-96 |
| | | | left MCAAP | 89-94 |
| | | | left MCAPP | 90-94 |
| | | | left MCAA | 94-97 |
| | | | left MCAPT | 92-94 |
| | | | left MCAMT | 91 |
| | | | left MCAAT | 90-92 |
| | | | left MCAPF | 88 |

TABLE 2-continued

| Chunk code | chunk | Accuracy (%) | Main cerebral artery branch | Accuracy (%) |
|---|---|---|---|---|
| A5 | Right anterior basal ACA | 87-92 | Right A1 | 93-95 |
| | | | right A2 | 97-99 |
| | | | right A1A2 | 97 |
| A6 | Left anterior basal ACA | 82-89 | Left A1 | 94-95 |
| | | | left A2 | 96-97 |
| | | | left A1A2 | 76-100 |
| A9 | Right anterior pial ACA | 88-95 | Right ACAMO | 89 |
| | | | Right A2F | 90-96 |
| | | | Right ACAC | 94-97 |
| | | | Right ACAP | 97-98 |
| A10 | Left anterior pial ACA | 88-94 | Left ACAMO | 88 |
| | | | Left A2F | 93-96 |
| | | | Left ACAC | 93-96 |
| | | | Left ACAP | 97-98 |
| P1 | Right posterior VA | 95-97 | Right VA | |
| P2 | Left posterior VA | 94-97 | Left VA | |
| P3 | Right posterior basal PCA | 91-97 | Right P1 | 86-89 |
| | | | Right P2 | 90-92 |
| | | | Right P1P2 | 87-94 |
| | | | Right P3P4 | 98 |
| P4 | Left posterior basal PCA | 94-97 | Left P1 | 86-90 |
| | | | Left P2 | 93-95 |
| | | | Left P1P2 | 94-97 |
| | | | Left P3P4 | 98-99 |
| P5 | Right posterior pial PCA | 87-93 | Right PPA | 88 |
| | | | right HA | NA |
| | | | right PCAAT | 86-93 |
| | | | right PCAPT | 96-100 |
| | | | right PCALP | NA |
| | | | right PCOA | 93-98 |
| P6 | Left posterior pial PCA | 89-94 | Left PPA | 87 |
| | | | left HA | NA |
| | | | left PCAAT | 81-94 |
| | | | left PCAPT | 97-98 |
| | | | left PCALP | 100 |
| | | | left PCOA | 78-95 |
| P7 | Right SCA, AICA, and PICA | 94-97 | Right PICA | 95-98 |
| | | | Right AICA | 94-97 |
| | | | Right IAA | 79 |
| | | | Right SCA | 99 |
| P8 | Left SCA, AICA, and PICA | 90-97 | Left PICA | 96-98 |
| | | | Left AICA | 89-96 |
| | | | Left IAA | NA |
| | | | Left SCA | 98-99 |
| P0 | BA | 93-97 | BA (G190) | |
| A0 | ACOA | 37-91 | ACOA (G200) | |

Abbreviations in Table 2 mean the following: ICA (internal carotid arteries), OA (ophthalmic arteries), ACHA (anterior choroidal arteries), VA (vertebral arteries), PICA (posterior inferior cerebellar arteries), AICA (anterior inferior cerebellar arteries), IAA (internal auditory arteries), SCA (superior cerebellar arteries), PCOA (posterior communicating arteries), PCA (posterior cerebral arteries), P1 (pre-communicating PCA), P2 (post-communicating PCA), P1P2 (the coalescence among P1 and P2), P3P4 (the concoction of quadrigeminal and calcarine PCA), PPA (direct peduncular perforating arteries), HA (hippocampal arteries), PCAAT (anterior temporal PCA), PCAPT (posterior temporal PCA), PCALP (lateral posterior choroidal arteries), M1 (sphenoidal middle cerebral artery), MCA (middle cerebral arteries), MCAS (superior division of MCA), MCAI (inferior division of MCA), MCALO (lateral orbitofrontal arteries), MCAPR (pre-Rolandic MCA), MCAR (Rolandic MCA), MCAAP (anterior parietal MCA), MCAPP (posterior parietal MCA), MCAA (angular MCA), MCAPT (posterior temporal MCA), MCAMT (middle temporal MCA), MCAAT (anterior temporal MCA), MCAPF (pre-frontal MCA), ACA (anterior cerebral arteries), A1 (horizontal pre-communicating ACA), A2 (vertical post-communicating pre-callosal ACA), A1A2 (the combination of A1 and A2), ACAMO (medial orbitofrontal ACA), A2F (frontopolar vertical post-communicating precallosal ACA), ACAC (callosomarginal ACA), ACAP (peri-callosal ACA), BA (basilar artery), ACOA (anterior communicating artery).

The classification prediction accuracy was examined for each cohort. The prediction accuracy in the control group ranged from 90 to 99% except for right MCAPF, left A1/A2, and left PCAAT. In the ICAS group, the prediction accuracy shows 91-100% for ICA, 85-98% for MCA, 88-100% for ACA, 87-100% for PCA, and 96-99% for SCA-AICA-PICA. In the stroke group, the prediction accuracy showed 94-100% for ICA, 90-96% for MCA, 94-98% for ACA, 90-99% for PCA, and 96-99% for SCA-AICA-PICA. The AUC-ROC for cerebral artery branch classification showed a high overall performance of and the PRC showed 0.992.

The researcher also performed external validation. The external verification was performed as a verification of the ability to identify stroke patients. The researcher built a learning model using only the data of the control group. In other words, the learning model used for external verification corresponds to a model that outputs a probability value for stroke patients without classifying the cerebral artery branch. The researcher evaluated the ability to distinguish between stroke patients for the ICAS group (46 people) and the stroke group (69 people).

Figure 7:
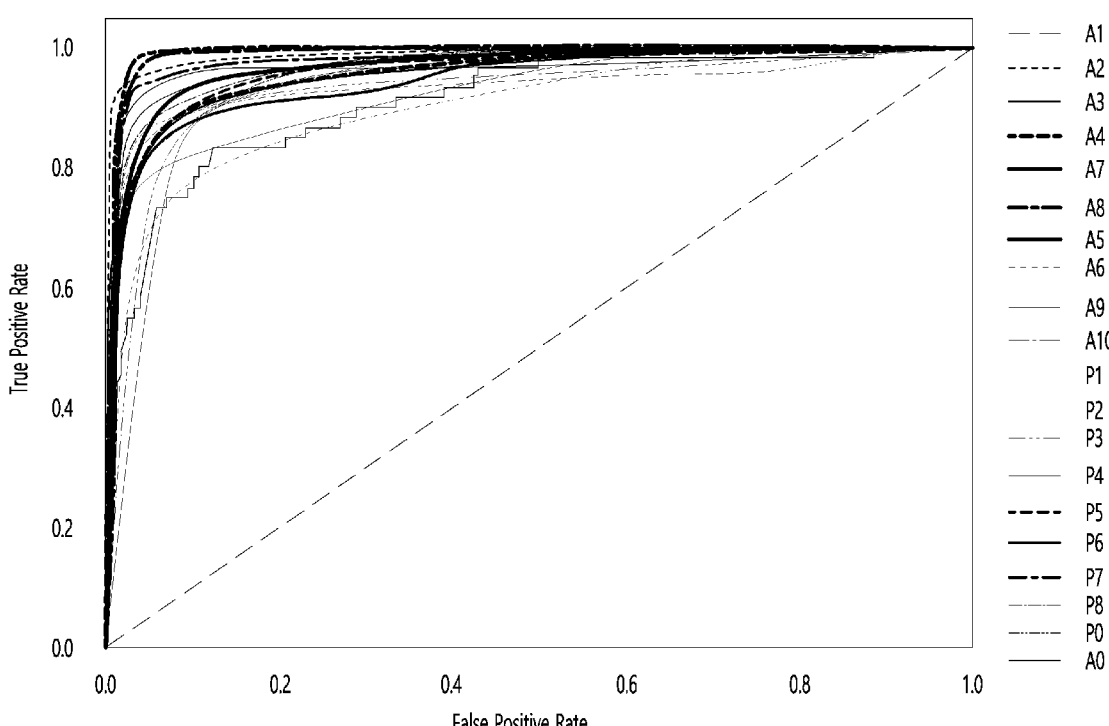
FIG. 7 is an ROC curve illustrating performance for the stroke group.
Figure 8:
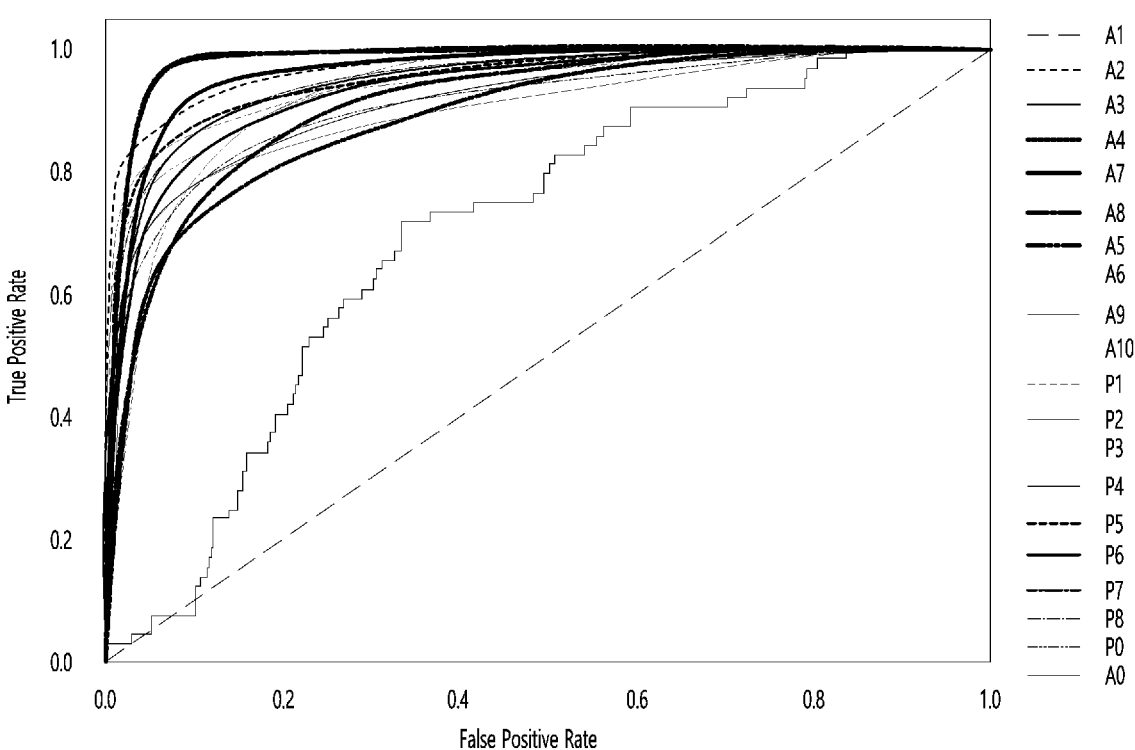
FIG. 8 is an ROC curve illustrating performance for the ICAS group.

FIGS. 7 to 8 illustrate results of verifying performance to identify stroke patients. FIG. 7 is an ROC curve showing performance for the stroke group. For the stroke group, the micro-average AUC was 0.97; and the macro-average AUC was 0.96. FIG. 8 illustrates an ROC curve showing performance for the ICAS group. For the ICAS group, the micro-average AUC was 0.95, and the macro-average AUC was 0.92. The model for identifying stroke patients showed significantly higher classification accuracy.

Figure 9:
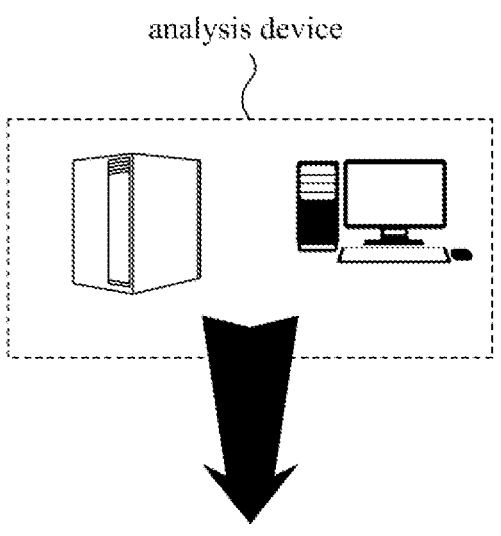
FIG. 9 illustrates an example of an analysis device for classifying cerebral artery branches in a TOF MRA image.
Figure 9:
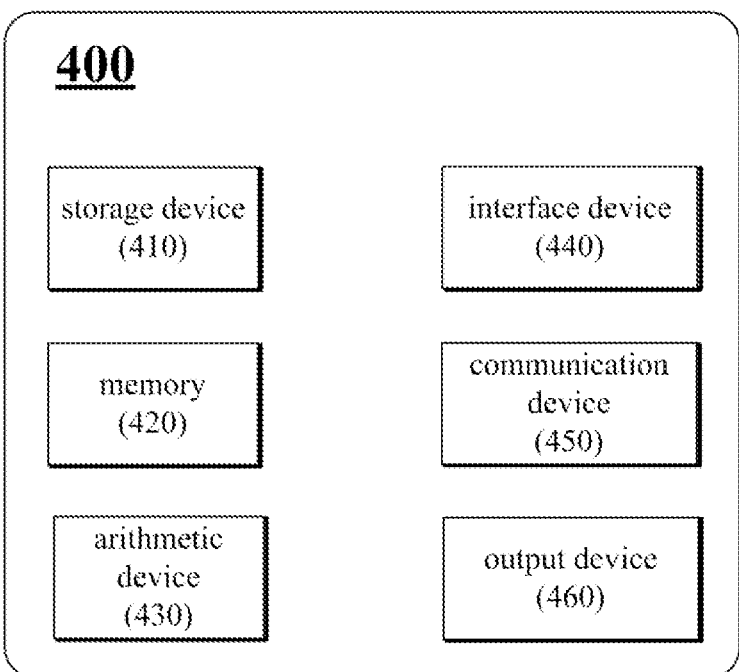

FIG. 9 illustrates an example of an analysis device 400 for classifying cerebral artery branches in a TOF MRA image. Herein, the analysis device 400 may determine whether the subject has a brain disease based on the MRA image which is input according to the used learning model.

The analysis device 400 corresponds to the analysis device (130 and 140 in FIG. 1). The analysis device 400 may be physically implemented in various forms. For example, the analysis device 400 may have a form of a computer device such as a PC, a network server, and a chipset dedicated to data processing.

The analysis device 400 may include a storage device 410, a memory 420, an arithmetic device 430, an interface device 440, a communication device 450, and an output device 460.

The storage device 410 may store MRA images generated by the MRA.

The storage device 410 may store codes or programs to extract the aforementioned cerebrovascular structure (spot, segment, etc.) from the MRA image.

The storage device 410 may store codes or programs to extract feature values (feature vectors) for spots of a cerebrovascular structure. (i) The feature values may include at least one of factors, such as a large cerebrovascular cross-section area, a maximum inscribed sphere radius, a minimum diameter, a maximum diameter, a maximum-minimum radius ratio, a surface circumference, distortion, curvature, and lumen roundness. (ii) Furthermore, the feature values may further include a brightness value for the corresponding spot area.

The storage device 410 may store the first learning model that classifies the corresponding chunks in units of spots and the second learning model that classifies the cerebral artery branches for each of spots belonging to the same chunk, as described in FIGS. 2 and 3.

Furthermore, the storage device 410 may store a learning model that receives spots belonging to the same chunk and classifies whether or not the subject of the current input image has a brain disease. Herein, the learning model should be trained in advance as a model that receives spots belonging to chunks and classifies a specific brain disease (e.g., cerebral stroke). In some cases, the learning model may be trained as a model that receives spots of a certain area, rather than a specific chunk and classifies a specific brain disease.

The memory 420 may store data and information generated during a process in which the analysis device 400 classifies a cerebral artery branch in an MRA image or identifies whether a patient has a brain disease.

The interface device 440 serves to receive certain commands and data from the outside. The interface device 440 may receive an MRA image from an input unit or an external storage device which is physically connected. The interface device 440 may transmit, to an external object, a result obtained by classifying the MRA image.

The communication device 450 refers to a component that receives and transmits certain information through a wired or wireless network. The communication device 450 may receive the MRA image from the external object. Alternatively, the communication device 450 may transmit the result obtained by classifying the MRA image, to an external object such as a user terminal.

Since the interface device 440 and the communication device 450 are configured to send and receive certain data from a user or other physical object, they may also be referred to as an input/output device in combination. The interface device 440 and the communication device 450 may also be referred to as an input unit in combination, when being limited to information or data input functions.

The output device 460 serves to output certain information. The output device 460 may output interfaces necessary for data processing, MRA images, cerebrovascular structures (4D models) extracted from MRA images, chunk classification, cerebral artery branch classification, and brain disease classification.

The arithmetic device 430 may classify the cerebral artery branches in the MRA image.

The arithmetic device 430 may reconstruct the structures in the MRA image through geometry processing. Here, the arithmetic device 430 may identify spots, segments, etc., which are the cerebrovascular structures as described above.

The arithmetic device 430 may segment a plurality of cells based on each vertex of the isosurfaces in the continuous 3D space in the MRA image. In this process, the arithmetic device 430 may perform a pre-processing process, such as noise removal and normalization in an image. The arithmetic device 430 segments the structure into a plurality of cells constituting the vascular surface, and extracts the main arterial centerline from the border surface of each cell in cerebrovascular MRA.

The arithmetic device 430 may segment the vascular surface into cells of a certain size in the cerebrovascular MRA image, to extract the starting point and skeleton of the central line of the brain artery based on the vascular surface. The arithmetic device 430 may perform vascular skeleton refinement to make the end point of the center line more distinct. The arithmetic device 430 may (i) skeletonize the cerebrovascular regions and surfaces; (ii) prune branches under a predetermined threshold; (iii) create a linked list of tree structures based on the refined backbone structure; and (iv) determine the end point by designating a leaf node from the linked list. The analysis device may extract the center line of the blood vessel by tracing the cell boundary connecting the determined start point and end point.

The arithmetic device 430 may identify spots, which are basic units of cubic cells of a 3D cerebral artery tree having regular intervals from the center line of the artery. In addition, the arithmetic device 430 may identify a segment of a specific region in which a number of spots is segmented based on a branch point in the vascular structure.

The arithmetic device 430 may input the spots extracted from the MRA image into the first learning model in units of spots to classify chunks to which the input spots belong. The arithmetic device 430 may extract feature values of spots and input the extracted feature value to the first learning model. The operation and learning process of the first learning model are described above. The first learning model may be a DNN-based model. Through this process, the corresponding chunk is determined for each individual spot.

In addition, the arithmetic device 430 may determine a final classification result in units of segments. As mentioned above, the arithmetic device 430 may set a value of the most classified results based on a result of chunk classification for spots belonging to the same segment, as a result of chunk classification of spots belonging to the corresponding segment.

Thereafter, the arithmetic device 430 may input spots belonging to the same chunk into the second learning model in units of spots, and classify cerebral artery branches to which the spots belong. The arithmetic device 430 may extract feature values of spots and input the extracted the feature values into the second learning model. The operation and learning process of the second learning model are described above. The second learning model may be a DNN-based model. The second learning model may be an ensemble model using heterogeneous learning models.

In addition, the arithmetic device 430 may determine a final classification result in units of chunks. As mentioned above, the arithmetic device 430 may set a value of the most classified results based on cerebral artery branch classification results of spots belonging to the same chunk, as a result of cerebral artery branch classification of spots belonging to the corresponding chunk.

Furthermore, the arithmetic device 430 may verify or correct the cerebral artery branch classification result (primary classification) for the spots in a different method. For example, the analysis device may verify whether the direction is reversed based on 3D coordinates for segments (branches belonging to the corresponding segment) in which branches are clearly segmented into left and right or up and down in the image data, and correct the classification information when the direction is reversed.

Through this process, the arithmetic device 430 may classify the structure in units of cerebral artery branches extracted from the MRA image.

Meanwhile, the arithmetic device 430 may identify whether the patient has a specific brain disease on the basis of the MRA image. Herein, the arithmetic device 430 should use a pre-learned model for the purpose of brain disease identification. This has been mentioned in the aforementioned external verification process. The arithmetic device 430 may extract spots from MRA images and input feature values for the spots into brain disease classification models, to identify whether the subject of the corresponding image is a patient who has a brain disease.

A learning model for identifying brain diseases may be a two-step model. In other words, the first learning model classifies chunks for spots extracted from MRA images, and the second learning model receives feature values of the spots in units of chunks and finally identifies brain disease. In this case, the second learning model may receive feature values in units of spots and identify brain disease based on evaluation results for all spots. Alternatively, the second learning model may receive feature values of all spots of the same chunk at once to identify whether or not there is a brain disease. The second learning model may be configured to extract vessel branch characteristics for spots or each spot and identify whether to have brain disease based on the extracted characteristics, which is determined according to the process in which the second learning model is trained and the training data.

The arithmetic device 430 may be a device such as a processor that processes data and processes certain operations, an AP, or a chip in which program is embedded.

In addition, the image processing method, the MRA-based cerebral arterial blood vessel analysis method, the cerebral artery branch classification method, and the brain disease classification method as described above may be implemented as a program (or application) containing an executable algorithm capable of being executed on a computer. The program may be stored and provided in a temporary or non-transitory computer readable medium. A non-transitory readable medium is not a medium that stores data for a short moment, such as a register, cache, or memory, but a medium that stores data semi-permanently and is capable of reading by a device. Specifically, various applications or programs described above may be stored and provided in a non-transitory readable medium, such as CD, DVD, hard disk, Blu-ray disc, USB, memory card, read-only memory (ROM), programmable read only memory (PROM), erasable PROM (EPROM) or electrically EPROM (EEPROM) or flash memory.

The temporary readable medium refers to various RAMs, such as static RAM (SRAM), dynamic RAM (DRAM), synchronous DRAM, SDRAM, double data rate SDRAM (DDR SDRAM), enhanced SDRAM (ESDRAM), Synclink DRAM (SLDRAM), and Direct Rambus RAM (DRRAM).

It is noted that this embodiment and the accompanying drawings in the specification only clearly show some of the technical ideas included in the foregoing technology, and all modifications and specific embodiments that may be easily inferred by those skilled in the art within the scope of the technical idea included in the specification and drawings of the foregoing technology are included in the scope of rights of the foregoing technology.

What is claimed is:

1. A method of classifying a cerebrovascular branch in cerebrovascular image, the method comprising:

receiving, by an analysis device, a cerebrovascular image of a subject;

extracting, by the analysis device, a plurality of vascular unit structures from the cerebrovascular image based on geometric features of a three-dimensional (3D) model;

extracting, by the analysis device, feature values for each of the plurality of vascular unit structures;

inputting, by the analysis device, the feature values of each of the plurality of vascular unit structures into a first learning model trained in advance, and classifying chunks to which each of the plurality of vascular unit structures belongs; and inputting, by the analysis device, the feature values of each of the vascular unit structures belonging to same chunk into a second learning model trained in advance, and classifying a vessel branch composed of the vascular unit structures belonging to the same chunk, and wherein each vascular unit structure is a spot, and the spot is a cell having a regular spacing from the artery center line extracted from the cerebrovascular image.

2. The method of claim 1, wherein the chunk is, as a higher structure of a vessel branch including at least one vessel branch type, a vascular unit structure segmented into different types according to at least one criterion of (i) symmetry; (ii) anterior or posterior; (iii) basal or pial; and (iv) a group including criteria of middle cerebral arteries (MCA), anterior cerebral arteries (ACA) and posterior cerebral arteries (PCA).

3. The method of claim 1, wherein the feature values include cerebral vessel cross-sectional area, maximum inscribed sphere radius, minimum diameter, maximum diameter, maximum-minimum radius ratio, surface circumference, distortion, curvature, and lumen roundness.

4. The method of claim 3, wherein the feature values further include a brightness value of the vascular unit structure.

5. The method of claim 1, wherein the classifying of the chunks includes:

performing, by the analysis device, primary chunk classification for each of the plurality of vascular unit structures using the first learning model; and performing, by the analysis device, secondary chunk classification for the vascular unit structures belonging to same segment, in a majority voting manner based on results of the primary chunk classification of the vascular unit structures belonging to the same segment among the plurality of vascular unit structures, wherein the segment is composed of vascular unit structures belonging to a region segmented by a branch point in a vascular structure.

6. The method of claim 1, wherein the classifying of the vessel branch includes:

performing, by the analysis device, primary vessel branch classification for each of the plurality of vascular unit structures belonging to same chunk using the second learning model; and performing, by the analysis device, secondary vessel branch classification for the vascular unit structures belonging to same chunk, in a majority voting manner based on results of the primary vessel branch classification of the vascular unit structures belonging to the same chunk among the plurality of vascular unit structures, wherein the segment is composed of vascular unit structures belonging to a region segmented by a branch point in the vascular structure.

7. The method of claim 1, wherein the classifying the vessel branch includes:

performing, by the analysis device, primary vessel branch classification for each of the plurality of vascular unit structures belonging to same chunk by using the second learning model; and correcting, by the analysis device, the primary vessel branch classification result, when results of the primary vessel branch classification of vascular unit structures belonging to same chunk among the plurality of vascular unit structures are different from information identified in the cerebrovascular image, wherein the segment is composed of vascular unit structures belonging to a region segmented by a branch point in the vascular structure.

8. An analysis device for analyzing a cerebrovascular branch in cerebrovascular image, the device comprising:

an input device receiving a cerebrovascular image of a subject;

a storage device storing a first learning model that classifies chunks to which a vascular unit structure belongs and a second learning model that classifies a cerebrovascular branch of the vascular unit structure belonging to the same chunk; and an arithmetic device extracting a plurality of vascular unit structures based on geometric features of a three-dimensional (3D) model from the cerebrovascular image, inputting feature values for each of the plurality of vascular unit structures into the first learning model to classify chunks to which each of the plurality of vascular unit structures belongs, and inputting feature values of each of the vascular unit structures belonging to the same chunk into the second learning model to analyze vessel branch characteristics constituted by the vascular unit structures belonging to the same chunk, and wherein each vascular unit structure is a spot, and the spot is a cell having a regular spacing from the artery center line extracted from the cerebrovascular image.

9. The device of claim 8, wherein the chunk is a vascular unit structure segmented into different types according to at least one criterion of (i) symmetry; (ii) anterior or posterior; (iii) basal or pial; and (iv) a group including criteria of middle cerebral arteries (MCA), anterior cerebral arteries (ACA) and posterior cerebral arteries (PCA), as a higher structure of a vessel branch including at least one vessel branch type.

10. The device of claim 8, wherein the feature values include cerebral vessel cross-sectional area, maximum inscribed sphere radius, minimum diameter, maximum diameter, maximum-minimum radius ratio, surface circumference, distortion, curvature and lumen roundness.

11. The device of claim 10, wherein the feature values further include a brightness value of the vascular unit structure.

12. The device of claim 8, wherein the arithmetic device performs primary chunk classification for each of the plurality of vascular unit structures using the first learning model, and performs secondary chunk classification for the vascular unit structures belonging to same segment, in a majority voting manner based on results of the primary chunk classification of the vascular unit structures belonging to the same segment among the plurality of vascular unit structures; and wherein the segment is composed of vascular unit structures belonging to a region segmented by a branch point in a vascular structure.

13. The device of claim 8, wherein the vessel branch characteristics are vessel branch classifications of the vascular unit structure belonging to the same chunk.

14. The device of claim 8, wherein the vessel branch characteristics are results of identifying whether or not the subject has a brain disease.

* * * * *